United States Patent
Guiriba et al.

(10) Patent No.: US 8,808,459 B1
(45) Date of Patent: Aug. 19, 2014

(54) METHOD FOR CLEANING POST-SPUTTER DISKS USING TAPE AND DIAMOND SLURRY

(75) Inventors: Noel A. Guiriba, San Jose, CA (US); Curtis L. Westerfield, Milpitas, CA (US)

(73) Assignee: WD Media, LLC, San Jose, CA (US)

( * ) Notice: Subject to any disclaimer, the term of this patent is extended or adjusted under 35 U.S.C. 154(b) by 510 days.

(21) Appl. No.: 12/873,485

(22) Filed: Sep. 1, 2010

(51) Int. Cl.
*B08B 7/00* (2006.01)

(52) U.S. Cl.
USPC .................................. 134/6; 134/32; 134/34

(58) Field of Classification Search
None
See application file for complete search history.

(56) References Cited

U.S. PATENT DOCUMENTS

| | | |
|---|---|---|
| 4,347,689 A | 9/1982 | Hammond |
| 4,514,937 A | 5/1985 | Gehrung et al. |
| 4,656,790 A | 4/1987 | Mukai et al. |
| 4,845,816 A | 7/1989 | Nanis |
| 5,012,618 A | 5/1991 | Price et al. |
| 5,018,311 A | 5/1991 | Malagrino, Jr. |
| 5,431,592 A | 7/1995 | Nakata |
| 5,954,566 A | 9/1999 | Bauer |
| 6,168,831 B1 | 1/2001 | Khan et al. |
| 6,283,838 B1 | 9/2001 | Blake et al. |
| 6,408,678 B1 | 6/2002 | Chopra et al. |
| 6,592,435 B2 | 7/2003 | Kishima |
| 6,746,320 B2 | 6/2004 | Krusell et al. |
| 6,821,189 B1 | 11/2004 | Coad et al. |
| 6,893,329 B2 | 5/2005 | Tajima et al. |
| 2005/0056303 A1 | 3/2005 | Lee et al. |
| 2006/0130874 A1 | 6/2006 | Lee et al. |
| 2007/0202260 A1 | 8/2007 | Ito et al. |
| 2008/0131737 A1* | 6/2008 | Sakaguchi et al. ......... 428/846.6 |
| 2008/0233736 A1* | 9/2008 | Ohashi et al. ................ 438/633 |
| 2010/0003901 A1 | 1/2010 | Sakaguchi et al. |

* cited by examiner

*Primary Examiner* — Eric Golightly

(57) ABSTRACT

A method for cleaning a post-sputter flat media disk, comprises submerging the disk in a wet conveyor containing a liquid, loading the disk onto a spindle of a spindle system, rotating the disk, engaging the disk on both sides with a pair of rollers such that the disk is wiped on both sides at a disk-roller interface due to the motion of the spindle system, and dispensing a slurry at the disk-roller interface.

10 Claims, 6 Drawing Sheets

METHOD FOR CLEANING POST-SPUTTER DISKS USING TAPE AND DIAMOND SLURRY

TECHNICAL FIELD

This invention relates to the field of disk drives and more specifically, to a method for cleaning post-sputter disks using tape and a diamond slurry.

BACKGROUND

Referring to FIG. 1 (prior art), the most common way of removing surface asperities after sputtering involves a standard cleaning process 100 that utilizes buffing tape for cleaning post-sputter flat media disks. After sputtering (step 110), the disks are coated with a lubricant (step 120), and then buffed with the tape in a dry process environment (step 130). This type of process is the current post-sputter cleaning method used for most conventional flat media disks.

For discrete track media disks, it may be difficult to implement the type of buffing process described above because of the nano-imprinting process that typically follows. In most cases, the complete removal of the lubricant must be achieved or the photoresist material employed in the succeeding step will not securely adhere to the disks. The weak adhesion strength frequently causes the photoresist material to peel off during the subsequent stamping process, thereby resulting in a fouled stamper template.

Referring to FIG. 2 (prior art), another conventional process 200 is illustrated for cleaning post-sputter discrete track media disks prior to nano-imprint lithography. In particular, after sputtering (step 210), the process comprises an ultrasonic bath or soak (step 220), a scrubbing station for performing one or more scrubbing steps 230, 240, a rinse step 250 and a drying step 260. While this method is sufficient for getting rid of loose particles, it is not adequate for removing protrusions in the surface topography. In some cases, the use of different soaking agents, sponge materials, and even lengthening the brushing cycle can help further reduce the incidence of loose particles. However, such modifications tend to have a negligible effect on stubborn surface imperfections that can inflict permanent damage on the stamper.

Another conventional process is a widely used texturing process that adds uniform roughness to the surfaces of disks prior to sputtering as opposed to after sputtering. This process employs a tape material with an alumina or diamond slurry, or a fixed-abrasive tape in combination with a lubricant.

BRIEF DESCRIPTION OF THE DRAWINGS

The present invention is illustrated by way of example, and not limitation, in the figures of the accompanying drawings in which.

DETAILED DESCRIPTION

Figure 1:
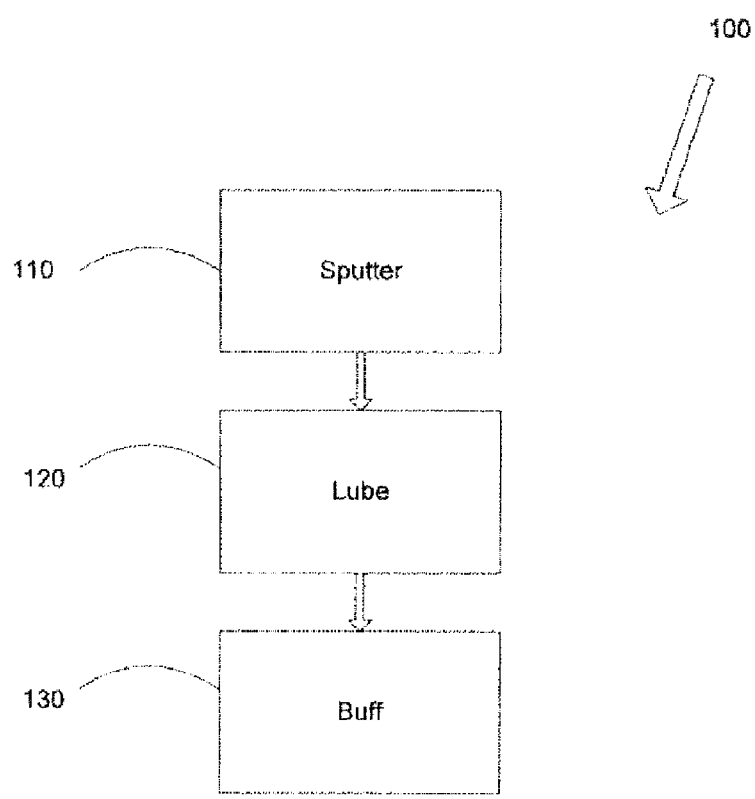
FIG. 1 (prior art) illustrates a conventional cleaning process for removing media disk surface asperities after sputtering.
Figure 2:
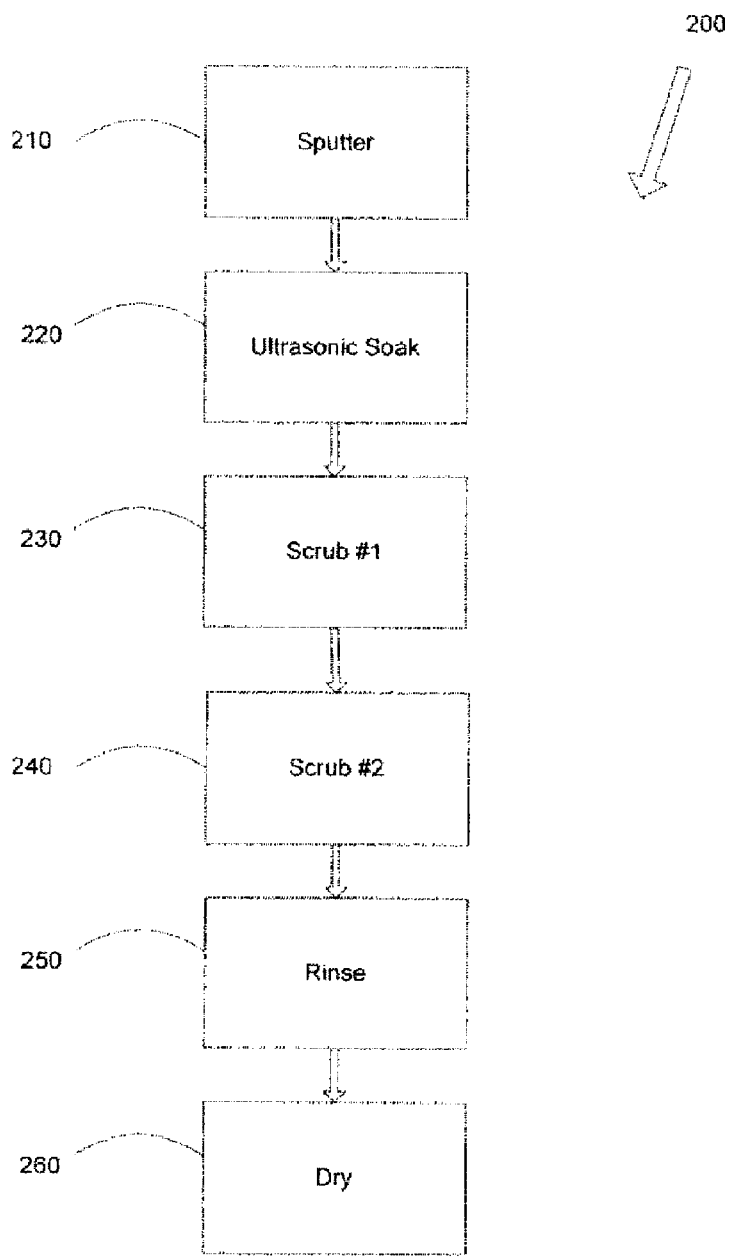
FIG. 2 (prior art) illustrates a conventional process car cleaning post-sputter discrete track media disks prior to nano-imprint lithography.

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

On flat media disks, the presence of asperities will cause glide failures during testing. On discrete track media disks, these surface imperfections can permanently damage the stamper template used in nano-imprint lithography. the present invention comprises a method for removing surface asperities on post-sputter disks though a process that employs tape with a diamond slurry, followed by conventional cleaning steps utilizing an ultrasonic bath, sponge scrubbers and a rinsing and drying station.

As stated, surface imperfections such as protrusions in the disk substrate or those resulting from the sputter process cannot be removed by conventional cleaning methods using ultrasonic baths and scrubbing stations that employ sponges and surfactants. In nano-imprint lithography, these protrusions can cause dimples on the stamper template. Such dimples on the template will result in repeated occurrences of imprint defects on each disk that goes under the stamper. The present invention provides a means for eliminating or significantly reducing these protrusions.

Embodiments of the present invention include a method for cleaning a post-sputter flat media disk, comprising the steps of submerging the disk in a wet conveyor containing a liquid, loading the disk onto a spindle of a spindle system, rotating the disk, engaging the disk on both sides with a pair of rollers such that the disk is wiped on both sides at a disk-roller interface due to the motion of the spindle system, and dispensing a slurry at the disk-roller interface. In some implementations, the slurry comprises diamond particles suspended in a water and coolant mixture. In some embodiments, the mixture comprises about 5%-20% synthetic coolant and about 80%-95% water. In other embodiments, the mixture comprises about 10% synthetic coolant and about 90% water.

In alternative embodiments of the method for cleaning a post-sputter flat media disk, the slurry comprises alumina particles suspended in a water and coolant mixture. In other embodiments, the slurry comprises colloidal silica particles suspended in a water and coolant mixture. In some cases, nylon tape is provided on an outer surface of the rollers. The spindle system may comprise an oscillating spindle system that oscillates at a predetermined frequency and amplitude. In addition, the liquid in the wet conveyor may comprise water. In certain embodiments, the method further comprises performing a series of soaking, scrubbing, rinsing and drying operations on the disk.

Further embodiments of the present invention include a cleaning device for a post-sputter flat media disk, comprising a wet conveyor for submerging the disk in a liquid, a spindle system including a spindle for rotating the disk at a high rate, a pair of rollers engaging the disk on both sides such that the disk is wiped on both sides at a disk-roller interface due to the motion of the spindle system, and a slurry dispensed at the disk-roller interface during rotation of the disk.

Figure 3:
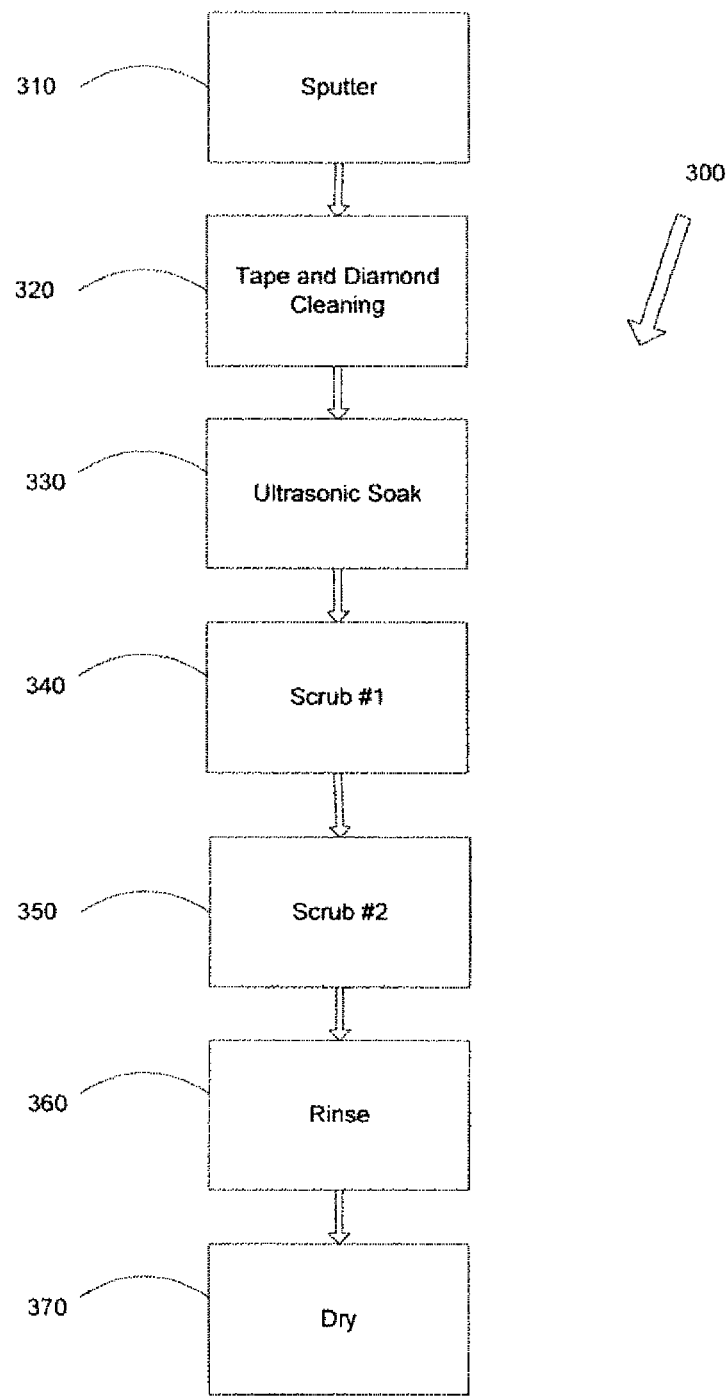
FIG. 3 illustrates a process for cleaning post-sputter discrete track media disks prior to nano-imprint lithography, in accordance with an embodiment of the present invention.

FIG. 3 illustrates a process 300 for cleaning post-sputter discrete track media disks prior to nano-imprint lithography, in accordance with an embodiment of the present invention. In particular, after sputtering (step 310), the process comprises tape and diamond cleaning (step 320). This tape and diamond cleaning step 320 may entail submerging the disk in a wet conveyor containing a liquid, loading the disk onto a spindle of a spindle system, rotating the disk, engaging the disk on both sides with a pair of rollers such that the disk is wiped on both sides at a disk-roller interface due to the motion of the spindle system, and dispensing a slurry at the disk-roller interface. The process 300 may further comprise an ultrasonic bath or soak (step 330), a scrubbing station for performing one or more scrubbing steps 340, 350, a rinse step 360 and a drying step 370.

According to the method of FIG. 3, the disks may be submerged in a wet conveyor that is filled with water. One at a time, each disk is loaded on a spindle and is rotated at a high rate. The spindle system oscillates at a specified frequency and amplitude while it is spinning, thereby providing a wiping action. A pair of taped rollers then advance and engage the disk on both sides at the specified load force. As the disk is wiped, slurry comprising diamond particles suspended in a water and coolant mixture is dispensed at the disk-tape interface. In some implementations, the slurry comprises diamond particles suspended in a water and coolant mixture. The presence of diamond in the slurry is crucial to polishing off protruding defects on the surface of the disks which can inflict damage on the stamper used in nano-imprint lithography or cause glide failures during testing of flat media disks. The slurry may alternatively comprise alumina particles or colloidal silica particles suspended in a water and coolant mixture, without departing from the scope of the invention.

Figure 4:
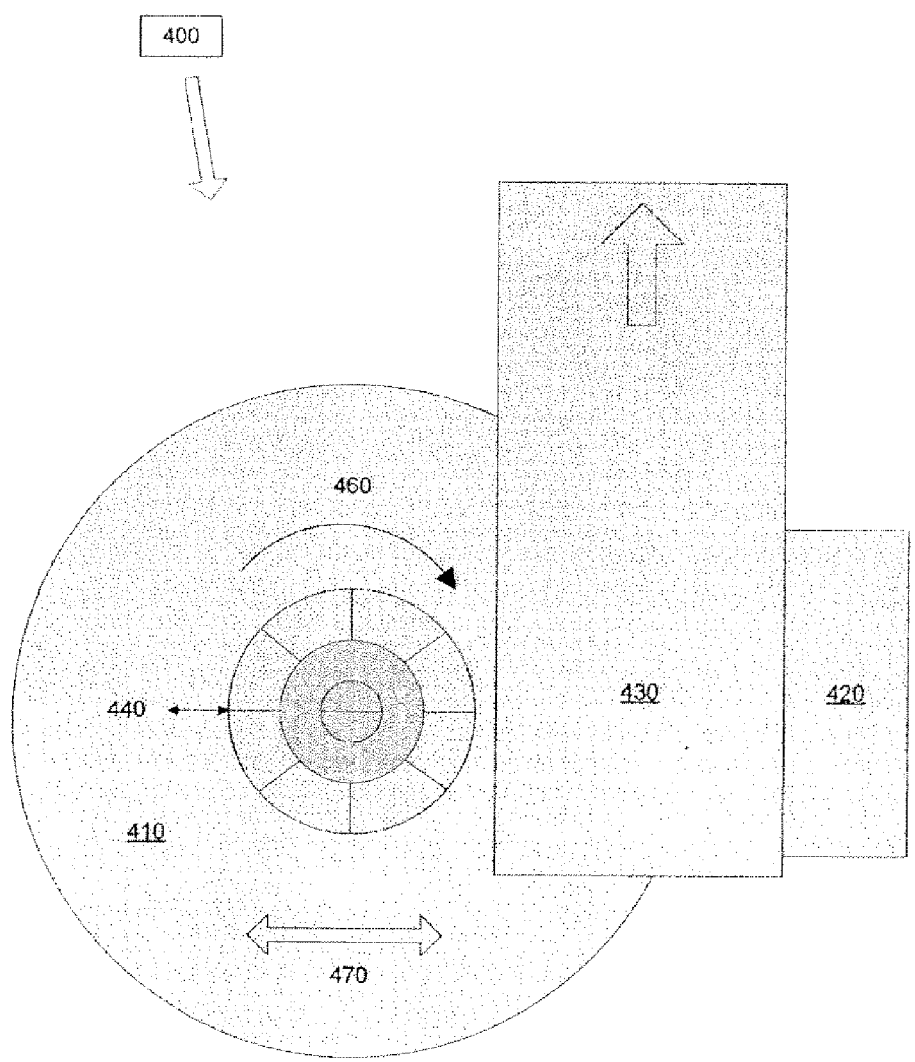
FIG. 4 illustrates a front view of a spindle system for cleaning post-sputter discrete track media disks prior to nano-imprint lithography, in accordance with an embodiment of the present invention.
Figure 5:
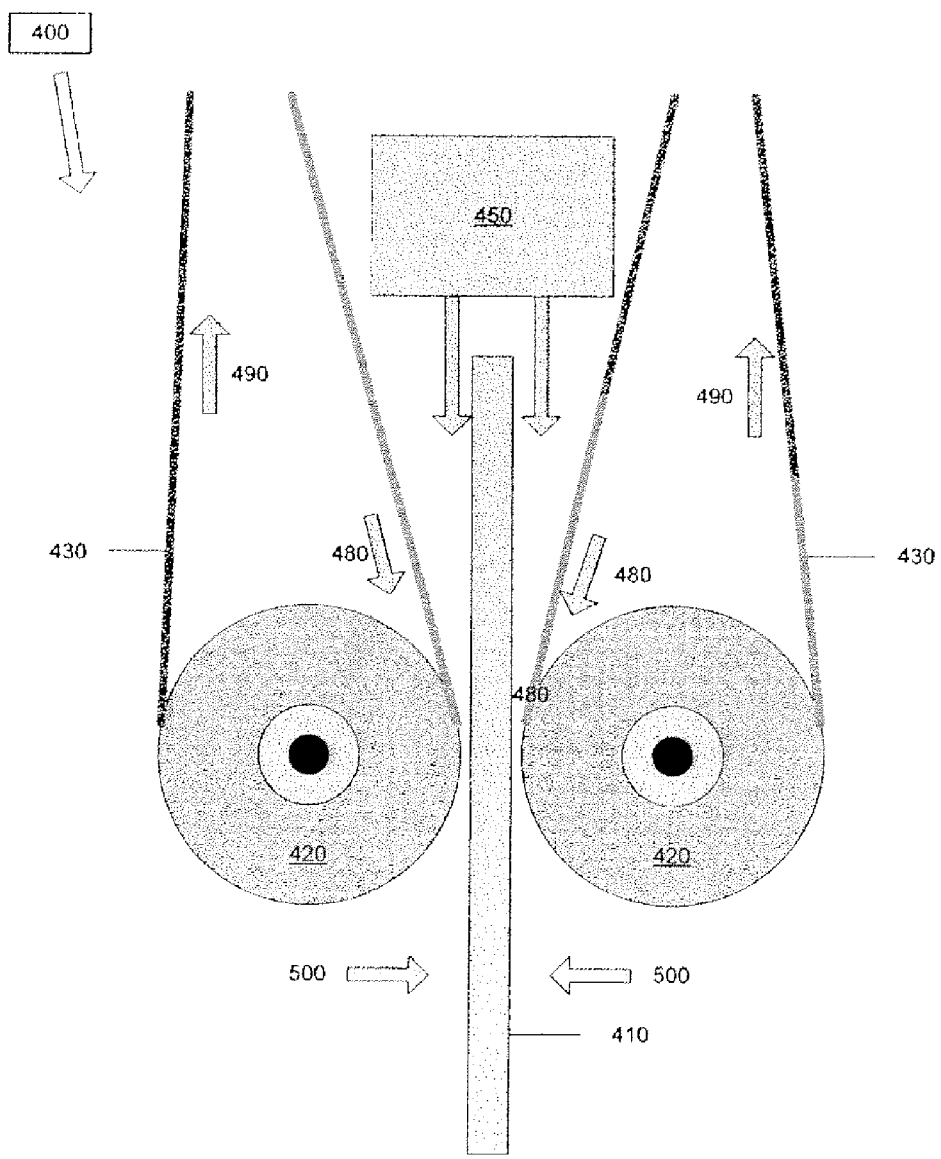
FIG. 5 illustrates a side view of the spindle system of FIG. 4 depicting the slurry being dispenses at the disk-tape interface, in accordance with an embodiment of the present invention.

Referring to FIGS. 4 and 5, an oscillating spindle system 400 for cleaning post-sputter discrete track media disks 410 prior to nano-imprint lithography is depicted. In particular, FIG. 4 is a top view of the spindle system 400, while FIG. 5 is a side view of the spindle system 400 depicting the slurry being dispensed at the disk-tape interface of the oscillating spindle system 400 of FIG. 4. In operation, a wet conveyor (not shown) may be employed for submerging the disk 410 in a liquid. The spindle system 400 includes a spindle for rotating the disk 410 at a high rate, a pair of rollers 420 having tape 430 provided on an outer surface of the rollers 420 for engaging the disk 410 on both sides, and a collet 440 for holding the disk in place during cleaning. In operation, a slurry is dispensed from a slurry dispenser 450 at the disk-tape interface during rotation of the disk 410, and the taped rollers 420 thoroughly wipe the disk 410 on both sides at a disk-tape interface due to the motion of the rollers 420 and the oscillation of the spindle system 400

In FIG. 4, the rotation of the disk is indicated by arrow 460, whereas the oscillation of the spindle system 400 is indicated by arrow 470. In FIG. 5, tape feed is indicated by arrows 480, while tape take-up is indicated by arrows 490. As stated, the spindle system 400 oscillates at a specified frequency and amplitude while it is spinning, thereby providing a wiping action. The pair of taped rollers 420 then advance and engage the disk 410 on both sides at the specified load force, as indicated by arrows 500. As the disk 410 is wiped, slurry comprising diamond particles suspended in a water and coolant mixture is dispensed at the disk-tape interface. This can be a continuous slurry flow or an intermittent slurry flow. In some embodiments, the water and coolant mixture comprises about 5%-20% synthetic coolant and about 80%-95% water. In other embodiments, the mixture comprises about 10% synthetic coolant and about 90% water.

Figure 6:
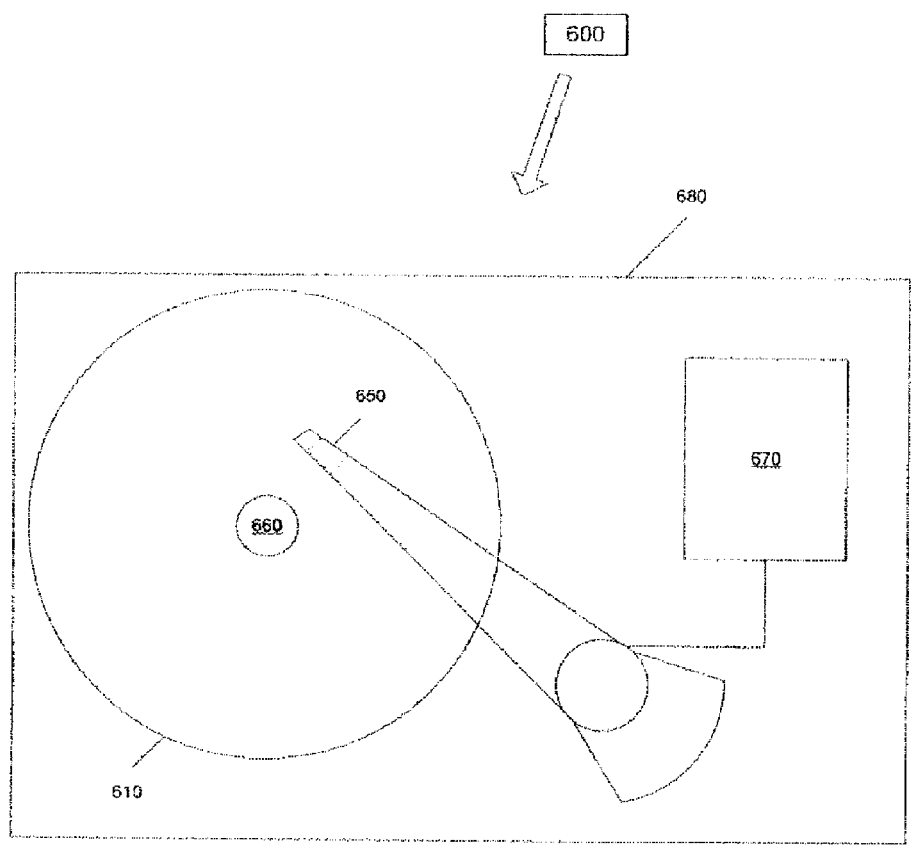
FIG. 6 illustrates a disk drive including a perpendicular magnetic recording disk, in accordance with an embodiment of the present invention.

FIG. 6 illustrates a disk drive 600 having disk 410. Disk drive 600 may include one or more disks 410 to store data. Disk 410 resides on a spindle assembly 660 that is mounted to drive housing 680. Data may be stored along tracks in the magnetic recording layer of disk 410. The reading and writing of data is accomplished with head 650 that has both read and write elements. The write element is used to alter the properties of the perpendicular magnetic recording layer of disk 410. In one embodiment, head 650 may have magneto-resistive (MR), or giant magneto-resistive (GMR) elements. In an alternative embodiment, head 650 may be another type of head, for example, an inductive read/write head or a Hall effect head. The disk drive 600 may be a heat assisted magnetic recording (HAMR) drive and incorporate components of a laser source, a waveguide, and a near-field transducer (not depicted). Techniques in generating and focusing a laser beam are known in the art, and thus, are not described in particular detail. A spindle motor (not shown) rotates spindle assembly 660 and, thereby, disk 410 to position head 650 at a particular location along a desired disk track. The position of head 550 relative to disk 410 may be controlled by position control circuitry 670. The use of disk 410 fabricated in the manners discussed above may improve the performance of the perpendicular magnetic recording layer of disk 410 by providing a higher magnetic anisotropy from an $L1_0$-ordered recording layer. The use of disk 410 fabricated in the manners discussed above may also enable the use of $L1_0$-structured media on non-glass substrates.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for cleaning a post-sputter flat media disk, comprising:
   loading the disk onto a spindle of a spindle system;
   rotating the disk;
   engaging the disk on both sides with a pair of rollers such that the disk is wiped on both sides at a disk-roller interface due to the motion of the spindle system; and
   dispensing a slurry only at the disk-roller interface, wherein the slurry comprises diamond particles suspended in a water and coolant mixture comprising about 5%-20% synthetic coolant and about 80%-95% water.

2. The method of claim 1, wherein the mixture comprises about 10% synthetic coolant and about 90% water.

3. A The method of claim 1, wherein the slurry comprises alumina particles suspended in the mixture.

4. The method of claim 1, wherein the slurry comprises colloidal silica particles suspended in the mixture.

5. The method of claim 1, wherein tape is provided on an outer surface of the rollers.

6. The method of claim 5, wherein the tape comprises nylon tape.

7. The method of claim 1, wherein the spindle system comprises an oscillating spindle system that oscillates at a predetermined frequency.

8. The method of claim 1, wherein the spindle system comprises an oscillating spindle system that oscillates at a predetermined amplitude.

9. The method of claim 1, further comprising performing a series of soaking, scrubbing, rinsing and drying operations on the disk.

10. A method for cleaning a post-sputter flat media disk, comprising:

loading the disk onto a spindle of an oscillating spindle system that oscillates at a predetermined frequency and a predetermined amplitude;

rotating the disk;

engaging the disk on both sides with a pair of taped rollers such that the disk is wiped on both sides at a disk-tape interface due to the oscillation of the spindle system;

dispensing a slurry comprising diamond particles suspended in a water and coolant mixture only at the disk-tape interface, wherein the slurry comprises about 5%-20% synthetic coolant and about 80%-95% water; and performing a series of soaking, scrubbing, rinsing and drying operations on the disk.

\* \* \* \* \*